Figure 1:
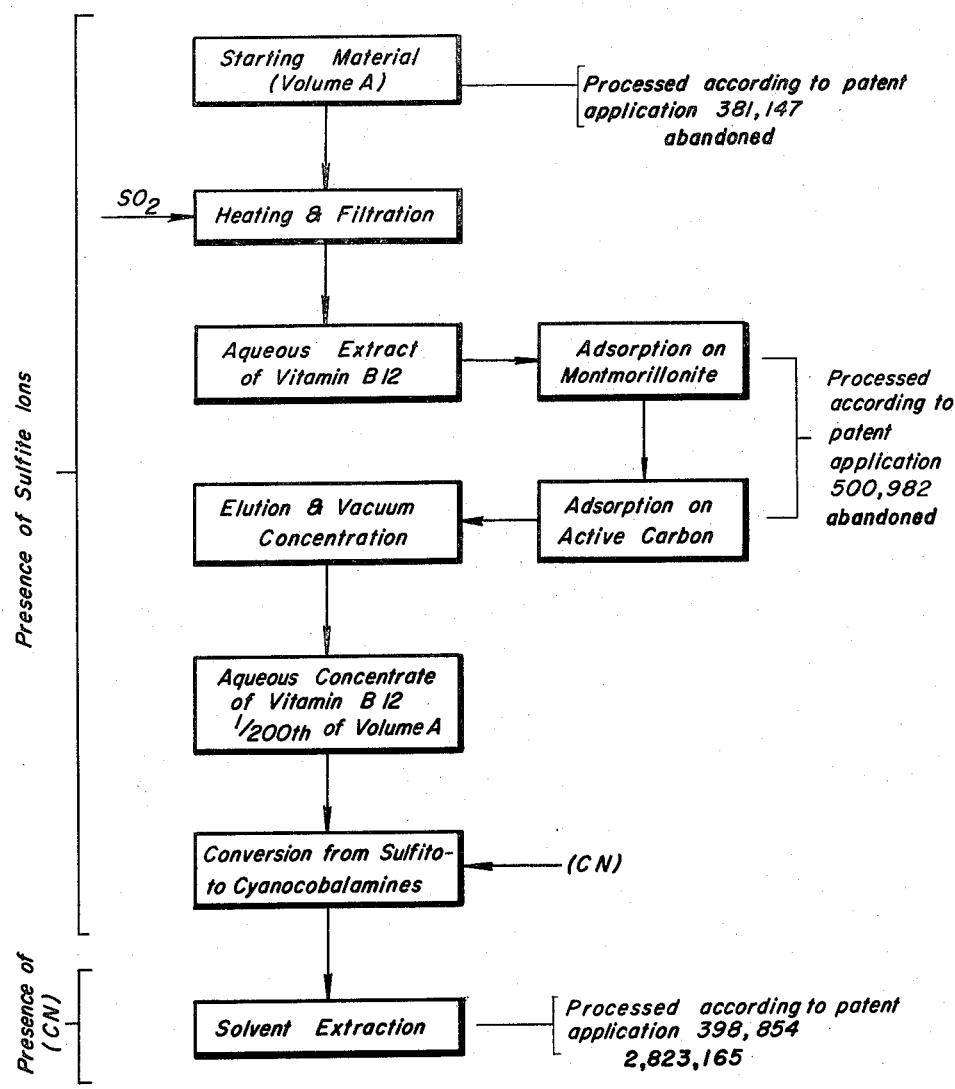
Figure 2:
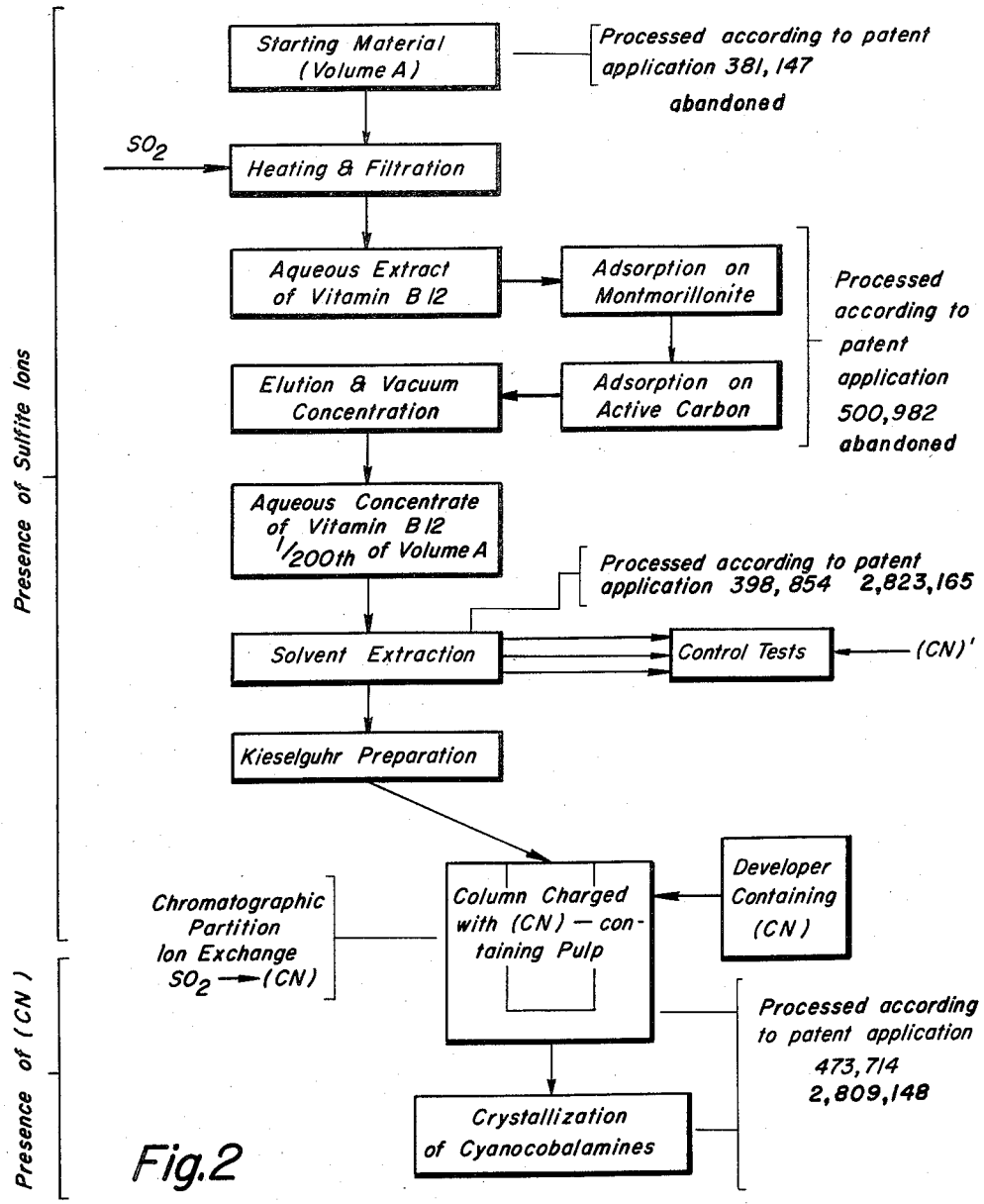

United States Patent Office 2,893,989
Patented July 7, 1959

2,893,989
PROCESS FOR PRODUCING CYANO COBALAMINES

Konrad Bernhauer and Siegfried Spaude, Aschaffenburg (Main), Germany, assignors to Aschaffenburger Zellstoffwerke Aktiengesellschaft, Redenfelden (Obb.), Germany Application January 23, 1957, Serial No. 635,853
Claims priority, application Germany January 26, 1956
11 Claims. (Cl. 260—211.5)

This invention relates to a process for producing cyano cobalamines from vitamin $B_{12}$-containing starting materials.

It is an object of this invention to provide an improved process for producing cyano cobalamines which process makes it possible to handle smaller amounts of substances containing the CN-group than in the known processes, and thereby reduces the danger of cyanide poisoning inherent in the use of such substances.

It is another object of the invention to provide a process for producing cyano cobalamines involving less danger of cyanide poisoning than the known processes, while still permitting an economical production of cyano cobalamines.

It is a further object of the invention to provide a process for producing cyano cobalamines involving less danger from cyanide poisoning by a more limited use of substances containing the CN-group, while preserving the effects of stabilizing and releasing vitamin $B_{12}$ during the entire process leading from the vitamin $B_{12}$-containing starting materials to the pure cyano cobalamines.

Various forms or modifications of vitamin $B_{12}$ are known, which are distinguished from each other by different inorganic or organic chemical groups being bound to the central cobalt atom either by coordinate (complex) links or by ionoganic (dissociable) bonds.

Among these modifications or forms of vitamin $B_{12}$, the most important one may be considered to be the complex compounds formed with cyanide ions, which compounds are usually referred to as monocyano cobalamines or briefly cyano cobalamines. Vitamin $B_{12}$ is preferably commercially used in this form of a cyano cobalamine.

When found in natural substrates, vitamine $B_{12}$ is usually present bonded to proteins by proteinaceous or peptide linkages. In order to release the vitamin from these bonds, the starting materials must be subjected to a treatment with proteolytic enzymes or simply to heating to bring about denaturation and coagulation of the proteins. By this treatment, vitamin $B_{12}$ becomes soluble in the form of its hydroxo complexes or aquo complexes.

In order to obtain cyano cobalamines as the end product, the extracts obtained in the above mentioned manner or the concentrates obtained therefrom must be treated with cyanide ions.

In a preferred mode of carrying out this known process, the processing of the starting materials from the very beginning takes place in the presence of cyanide ions. Thereby, vitamin $B_{12}$ is set free more easily. Moreover, the yield is increased in the presence of cyanide ions because the cyano complex form of vitamin $B_{12}$ is considerably more stable, when heated, than the other normally occurring hydroxo or aquo complexes of vitamin $B_{12}$.

Several methods are known for achieving the advantages resulting from the above described cyanide treatment.

Thus, in Patent 2,530,416 assigned to Merck & Co., suitable broths fermented by the growth of vitamin $B_{12}$ producing microorganisms in a suitable medium or concentrates of vitamin $B_{12}$ and vitamin $B_{12}$-like materials are treated with substances furnishing cyanide ions, thereby attaining an increase in the yield of vitamin $B_{12}$.

According to the process described in the German Patent 932,981 masses of microorganisms such as the mycella of Streptomyces strains containing vitamin $B_{12}$ active substances, are treated directly with cyanides following or concurrently with autolysis.

Furthermore, according to the British Patent 693,125 concentrates containing vitamins of the $B_{12}$ group are treated with cyanides, while an enzymatic digestion, for instance, with papain, may eventually take place during the cyanide treatment.

The British Patent 727,146 describes a process of treating a raw material containing at least 1% of vitamin $B_{12}$ in aqueous solution with cyanide ions and to extract the resulting vitamin $B_{12}$-cyano-complex with n-butanol in the presence of ammonium sulfate.

U.S. Patent 2,650,896 relates to a method of increasing the yield of vitamin $B_{12}$ by carrying out the fermentation step leading to the formation of vitamin $B_{12}$ in the presence of a substance capable of furnishing CN-groups to an organism. It is suggested that either an ionizable cyanide or a cyano complex compound such as potassium ferrocyanide or potassium ferricyanide are used as (CN) donators.

Finally, the published German patent application F 9534 IVa/30h describes the treatment of fermentation broths, the fermentation of which has been terminated, with cyano complex compounds such as potassium ferrocyanide or potassium ferricyanide and the like, or with nitriles for the purpose of setting free vitamin $B_{12}$.

All afore-mentioned processes suffer from a number of drawbacks.

Thus, the handling of the large amounts of hydrocyanic acid or cyanide salts required, according to the above described known processes, for the treatment of large volumina of liquids in particular when the latter are heated in order to set free vitamin $B_{12}$ and protect the same against decomposition, is risky, and necessitates special precautionary measures presenting considerable complications of industrial operation.

If, on the other hand, hydrocyanic acid or cyanides are caused to act only on concentrates, the reduced volumes of which necessitate smaller amounts of the poisonous materials, then one loses the advantages of effecting the release and stabilization of vitamin $B_{12}$ in all early stages of processing the vitamin $B_{12}$ containing crude materials, i.e. in that part of the entire process where the use of cyanide promises the biggest advantages; a considerable reduction of the vitamin $B_{12}$ yield is then unavoidable.

Finally, if the (CN) group is introduced only in the form of relatively inoffensive cyano complex compounds or nitriles instead of hydrocyanic acid or cyanides, far larger amounts of the former substances are required which threaten to make the entire process uneconomical.

Our new process for producing cyano cobalamines from vitamin $B_{12}$-containing starting materials makes use of a number of known facts, for instance, while vitamin $B_{12}$ as found in nature, i.e. bonded to proteins or peptides or in free state, or as hydroxocobalamines, vitamin $B_{12a}$ or vitamin $B_{12b}$ is not a very stable substance, in particular when heated, it is a known fact that a protective, i.e. a stabilizing influence is exercised on these relatively unstable substances by cyanide ions, but also by sulfite ions, as has been described by H. W. Loy, J. F. Haggerty and O. L. Kline (J. Ass. Off. Agric. Chem. 35, 169, 1952). This stabilizing effect of sulfite ions has been used in the past, for instance, by H. H. Fricke, B. Lanius, A. F.

DeRose, M. Lapidus and D. V. Frost (Fed. Proc. 9, 173, 1950); also by R. F. Prier, P. H. Derse and C. H. Krieger, Arch. Biochem. Biophys. 40, 474, 1952); and by J. S. Chiao and W. H. Peterson (Appl. Microbiol. 1, 42, 1953), in the preparation of samples for carrying out microbiological tests. It has also been attempted to utilize the protective effect of sulfite ions in the production of vitamin $B_{12}$-containing supplementary feeds (V. F. Pfeiffer, C. Vojnovich and E. N. Heger, [Ind. Eng. Chem. 46, 843, 1954]).

The complex compounds obtained from vitamin $B_{12}$ in the presence of sulfite ions have been designated as sulfito cobalamines (see Loy et al. supra) and can be isolated in crystalline form. E. A. Kaczka, D. E. Wolf, F. A. Kuehl and K. Folkers (J. Am. Chem. Soc. 73, 3569, 1951) thus obtained thin, dark-red colored needles, probably consisting of sulfito cobalamines by the action of sulfurous acid on vitamin $B_{12}$ (cyano cobalamines).

It should be noted that it cannot be determined at present with certainty whether the sulfite ion in the sulfito cobalamine complex is present as $HSO_3'$ or as $SO_3''$, and the term "sulfite ion" is, therefore, intended to cover the monovalent as well as the bivalent ion.

It is further known that, in accordance with the chemical law of mass action (Goldberg-Waage) sulfito cobalamines as well as all other cobalamines can be converted to cyano cobalamines by treatment with an excess of cyanide ions (see Skeggs et al. [Abs. of 119th Meeting of Am. Chem. Soc., 1951]). Thus, Chiao et al., supra, had treated citrate extracts containing sulfito cobalamine with cyanide ions for the purpose of microbiologically assaying vitamin $B_{12}$.

The process for manufacturing cyano cobalamines according to our invention permits one to attain the objects set forth hereinbefore by utilizing the above mentioned known facts in such a manner that, in a sequence of process steps, the favorable stabilizing effect of sulfite ions on vitamin $B_{12}$ is made use of during a first group of steps, while, at a determined stage of the process, in which vitamin $B_{12}$ is already liberated from the major portion of the accompanying impurities, the sulfito complex is converted to the cyano complex whereupon the remaining steps of the process are carried out to obtain the latter complex in pure, crystalline form, if so desired.

The process according to the invention, therefore, resides in a novel combination of a first group of steps which are carried out, according to a main feature of the invention, in the presence of sulfite ions, while the material under treatment involves large liquid volumes; the step of converting the sulfito cobalamine complex to cyano cobalamines at a determined stage of the volume reduction, i.e. a correspondent increase in vitamin $B_{12}$ activity per volume unit of the material, and, finally, a group of steps for purification and preparation of crystalline cyano cobalamines, which latter steps are all carried out in the presence of cyanide ions.

While, in all known processes for producing crystalline vitamin $B_{12}$ in its commercial form as cyano cobalamines, cyanides, cyano complex compounds, or nitriles, were caused to act on culture media or concentrates in which cobalamines are present either bonded to proteins or as hydroxo complexes, but never in the form of the sulfito complex of cobalamines.

The process according to the present invention provides for the conversion of the proteino or hydroxo complex first to the sulfito complex—while the liquid volumes being handled are still larger—and then further to the cyano complex only after the volumes of liquid involved in the process have been very substantially reduced.

While it has also been proposed, for instance, by Chiao and Peterson supra for the purpose of microbiologically assaying vitamin $B_{12}$ to convert sulfito cobalamines to cyano cobalamines in their initial, non-purified solution, the process according to our invention provides for the manufacture of crystallized vitamin $B_{12}$ by carrying out the conversion from the sulfito to the cyano complex only after a determined group of purification and concentration steps have already taken place.

According to another important feature of the invention, conversion of the sulfito cobalamines to cyano cobalamines is carried out when the original volume of liquid has been reduced to less than two hundredths of the starting volume of vitamin $B_{12}$-containing materials, i.e. preferably at a stage where the vitamin $B_{12}$ activity per volume unit of the concentrate has reached at least 200 times the amount present in the starting materials.

The process according to the invention will be more readily understood as described hereinafter in connection with the accompanying flow sheets of which:

Flowsheet I shows a first mode of operation for carrying out the process according to the invention; and Flowsheet II shows another mode of carrying out the process according to the invention.

According to the mode of carrying out the process of the invention illustrated in Flowsheet I, the raw materials containing viamin $B_{12}$ are treated by the method described in the abandoned U.S. patent application Ser. No. 381,147, filed on Sept. 18, 1953, in which one of us is a joint inventor, for the specific case of processing fermented sludge, which comprises the steps of heating the starting material in aqueous suspension in the presence of sulfite ions ($SO_2$-content of 0.05 to 0.2% weight by volume), whereby the vitamin $B_{12}$ active substances are liberated and transferred to an aqueous extract.

Subsequently the vitamin $B_{12}$ active substances are adsorbed on montmorillonite and then eluted, again in the presence of sulfite ions, as described in the pending U.S. patent application Ser. No. 500,982, filed on February 24, 1955, and assigned to the assignee of this application, now abandoned. The next following steps of adsorption on active carbon and elution of the cobalamines from the adsorbate are advantageously carried out also in the presence of sulfite ions, and so is the step of concentration of the carbon eluate by evaporation in vacuum.

By these various process steps the volume of the starting liquid solution or suspension has been reduced at least to the two-hundredth part thereof, and usually to the four-hundredth part.

Thus, if the starting material consists of 100 cubic meters (cb. m.) of digested sludge having a microbiologically assayed $B_{12}$ activity of, for instance, 0.5 milligram per liter (mg./l.) which corresponds to a total $B_{12}$ activity of 50 grams in the entire 100 cb. m., the aforesaid steps of the process, in the presence of sulfite ions, lead to obtaining a concentrate having a volume of only 250 liters (l.), which has in its dry matter content of about 10% a vitamin $B_{12}$ activity of 140 mg./l., i.e. a total $B_{12}$ activity of 35 g. in 250 l., which corresponds to a $B_{12}$ activity of 1.4 grams per kilogram of dry weight. The vitamin $B_{12}$ activity of the concentrate which is subjected to sulfito cyano conversion should preferably be at least 1 gram per kilogram of the dry weight content of the concentrate. The steps of the process described up to this stage, have been disclosed in patent applications Ser. Nos. 381,147 and 500,982 supra and are suitably combined to serve the purpose of the present process. At this stage of the process, the resulting concentrate may, for instance, be dried, and thus used alone or in mixture with different feeds as an auxiliary protein feed for animals.

The further processing according to the invention of the concentrate thus obtained comprises, in the first mode of practising the process of our invention, the conversion of the sulfito cobalamines to cyano cobalamines at this stage of the process.

In the above mentioned concentrate which usually contains a vitamin $B_{12}$ activity which is by 200 times higher than the original one, the entire vitamin $B_{12}$ content is now present in the form of sulfito cobalamines. The latter are now converted to cyano cobalamines under the effect of the chemical law of mass action by addition of an excess of cyanide ions.

The process of the invention is then completed, according to this first mode of operation, by the further steps of purification preferably with the aid of solvent extractors and by using the methods described in our pending patent application Ser. No. 398,854, filed on December 17, 1953, and assigned to the same assignee as this application, now Patent No. 2,823,165, issued February 11, 1958. According to the process of said patent, a concentrate containing vitamins of the $B_{12}$ group is extracted therefrom by treating the concentrate with an organic solvent mixture comprising a mono-halogenated phenol selected from the group consisting of mono-halogenated phenols having the halogen group in the position meta and mono-halogenated phenols having the halogen group in the position para to the hydroxyl group of the phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamin of the $B_{12}$ group dissolved in said solvent mixture; treating the thus formed organic extract solution containing the vitamins of the $B_{12}$ group with water and with a water soluble alcohol, thereby causing due to said alcohol substantially quantitative transfer of said vitamins of the $B_{12}$ group into the aqueous phase; saturating the thus obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed on said absorbent; and recovering the thus precipitated vitamins of the $B_{12}$ group. All these steps subsequent to the conversion of the sulfito to the cyano complex take place at relatively small volumes and are carried out in the presence of cyanide ions.

According to the second mode of carrying out the process of our invention, which mode is illustrated in Flowsheet II, the steps of the process up to and including that of obtaining an aqueous concentrate are carried out in the same manner as described above for the first mode of operation, i.e. in the presence of sulfite ions. The next following steps of the extractive purification of this concentrate are also carried out in the presence of sulfite ions and lead finally to a kieselguhr preparation.

During this extractive purification, we employ a novel method of controlling qualitatively the progress of the extraction process. In doing so, we utilize our discovery that a color change takes place from yellow or red-orange to a color range from red to violet, when cyanide ions are added to solutions of sulfito cobalamines. For it is more difficult to visually control the progress of the extractive purification of the cobalamines in the presence of sulfite ions, because most impurities are of yellow or yellow-brown color and are, therefore, difficult to distinguish from the solutions of the sulfito cobalamines which are of reddish-yellow or red-orange color. We, therefore, carry out a number of control tests by taking samples from the various extraction phases and adding cyanide ions to these samples after adjusting them to a pH of 6.5, whereupon a color change to from red to violet immediately indicates which fraction contains the cobalamines. In this manner the entire extraction step can be easily controlled and it becomes possible to carry out the entire process in the presence of sulfite ions just as easily as hitherto in the presence of cyanide ions.

Before beginning this solvent extraction as described in the patent application Ser. No. 398,854 supra, laboratory tests are made to determine the composition and ratios of the solvents to be used in the extraction.

The solvent extraction finally yields a kieselguhr preparation, similar to the one obtained by the method described in principle by W. Friedrich and K. Bernhauer (Z. Naturforschg. 9b, 755, 1954). This kieselguhr preparation is charged with sulfito cobalamines since, according to the second mode of operation of the present invention, the entire solvent extraction is carried out in the presence of sulfite ions.

The $B_{12}$ activity of the kieselguhr preparation is 20,000 times that of the initial activity per unit of volume. The sulfito cobalamines which are already present in highly purified form at this stage of the processing according to the invention, are then subjected, as the next process step, to chromatographic purification and separation of the different vitamin $B_{12}$ factors and, according to the invention, are converted during the chromatographic treatment to cyano cobalamines by applying an excess of cyanide ions. This stage of the process is carried out according to the method described in the pending patent application Ser. No. 473,714, filed on December 7, 1954, now Patent No. 2,809,148, issued Ocober 8, 1957, and assigned to the same assignee as the present application. According to the process of said patent, a mixture containing $B_{12}$ vitamin factors is treated to separate and purify the same by means of partition chromatography. This process comprises preparing a pulp from a cellulose material and a straight chain butyl alcohol containing water, charging the pulp onto a chromatographic column, then charging the mixture of $B_{12}$ vitamin factors onto the column, and developing the chromatogram by adding a water containing developer comprising a straight chain butyl alcohol, thereby eluting each of the vitamins $B_{12}$ factors contained in the mixture separately. According to this method, chromatography of the kieselguhr preparation of sulfito cobalamines is carried out on cellulose columns and the development of the column and separation of the different factors is effected with the aid of aqueous butanol in the presence of cyanide ions in sufficient concentration to bring about the conversion of the sulfito cobalamines to cyano cobalamines. The fractions of the various $B_{12}$ factors obtained by this chromatographic step are then processed to obtain the crystallized cyano cobalamines.

It will be easily understood that the importance of the process of our invention becomes particularly noticeable in large scale industrial production of cyano cobalamines. All steps of our process are easily put into practice since sulfite ions in the quantity required are completely harmless, and the conversion of sulfito cobalamines to cyano cobalamines is only effected at a stage in the process where the volumes of material to be handled are already relatively small.

The process according to our invention can be applied to all kinds of starting materials containing vitamin $B_{12}$. Thus it can be applied to digested sludge as well as to residues of methane fermentation, further to fermentation broths which are prepared for the purpose of producing vitamin $B_{12}$, and finally to activated sludge, to the residual water from fish processing plants and the like.

Moreover, the conversion of the sulfito to the cyano cobalamines may be effected with complex cyano compounds such as ferrocyanides or ferricyanides, or with nitriles and the like instead of cyanide ions. However, when using these compounds, larger quantities are required.

The mode of operation illustrated in Flowsheet I is the preferred one.

The process according to the invention is further illustrated by a number of examples given below, which are, however, not meant to be limitative in any way.

*Example 1*

Eight kilograms (kg.) of sodium bisulfite are added to 4 cubic meters (cb. m.) of digested sludge having a dry weight of 7% and a vitamin $B_{12}$ activity of 0.5 milligram per liter (mg./l.), (resulting in a concentration of 0.2% weight per volume of sulfite ions (usually calculated as $SO_2$ content)) i.e. a total activity of 2 grams (g.) as determined with the *Escherichia coli* mutant 113–3 test, the pH value of the sludge being adjusted to 6.5 by adding the required amounts of hydrochloric acid. The sludge is then heated to 80° C. and maintained at this temperature for 30 minutes, whereupon it is cooled and centrifuged, whereby 3 cb. m. of a centrifugate are obtained, which shows a total vitamin $B_{12}$ activity of 1.7 g. This step of the process according to the invention is carried out, in principle, according to the process described in patent application Ser. No. 381,147 supra.

The centrifugate is adjusted with hydrochloric acid to a pH of 2.5 and again clarified in a high speed centrifuge in order to separate the flocculated proteinaceous substances. The vitamins of the $B_{12}$ group are adsorbed in the resulting centrifugate on bentonite (0.5% by weight) such as, for instance, "Frankinol KL," manufactured by Pfirschinger Mineralwerke, Kitzingen (Main), Germany. After the bentonite adsorbate has been separated by means of a centrifugal sifter, the adsorbate is eluted with an aqueous solution of 2% by weight of sodium bicarbonate and 0.1% sodium bisulfite, after adjustment of a pH value of 8.5 and heating to 50° C. under constant stirring. After elution has been carried out three times, the combined volumes of the eluates amount to 300 liters (l.) showing a vitamin $B_{12}$ activity of 5 mg./l., i.e. a total activity of 1.5 g. This eluate is adjusted to a pH of 7.0 by the addition of acid, whereupon 1% by weight of active charcoal is added to the eluate while stirring the latter in order to adsorb the vitamins of the $B_{12}$ group contained in the resulting slurry. After the charcoal adsorbate has been separated in a centrifuge from the slurry, the adsorbate is eluted in a conventional manner with an eluting agent containing an alcohol and water. 50 l. of an eluate are obtained which has a vitamin $B_{12}$ activity of 27 mg./l., i.e. a total activity of 1.35 g. This part of the process is carried out, in principle, according to the method described in patent application Ser. No. 500,982 supra.

The eluate is then concentrated by means of vacuum evaporation, until 10 l. of an eluate concentrate are obtained which have a vitamin $B_{12}$ activity of 135 mg./l., i.e. a total of 1.35 g. At this stage of the process, a concentration of the vitamin $B_{12}$ activity by an approximately 270-fold amount has been achieved, namely from a volume of 4,000 l. to a volume of 10 l. taking into account the losses of activity incurred during the process. In this concentrate, the vitamins of the $B_{12}$ group are present as sulfito complexes. In order to convert the sulfito cobalamines into the corresponding cyano cobalamines, 10 g. (0.1% by weight per volume) of potassium cyanide are added to the concentrate, the pH of which is adjusted to 6.5 by adding thereto hydrochloric acid. The further processing of the concentrate is then carried out in a conventional manner until crystallized vitamin $B_{12}$ factors are obtained.

*Example II*

Four cb. m. of digested sludge are processed in the same manner as described in Example I, until 10 l. of a concentrate are obtained which has a vitamin $B_{12}$ activity of 140 mg./l., i.e., a total activity of 1.4 g. In this concentrate, the vitamins of the $B_{12}$ group are present as sulfito complexes.

The vitamins of the $B_{12}$ group are stabilized in the concentrate by adding to the latter 10 g. (0.1% weight/volume) of sodium bisulfite. Further purification is effected by transferring the sulfito cobalamines to an organic medium, such as, for instance, orthodichlorobenzene and phenol. This organic phase is then washed with a buffer solution, for instance, of phosphate buffer having a pH of 7.0, whereupon the vitamins of the $B_{12}$ group are transferred from the organic phase to the aqueous phase by adding a small amount of butanol and water to the organic phase. The aqueous solution is again purified with orthodichlorobenzene. All four stages of the extraction process are carried out in extraction centrifuges, the entire extraction method being similar, in principle, to the method disclosed in patent application Ser. No. 398,854 supra, with the difference that the vitamin $B_{12}$ factors are present during all these stages of the process, in the form of their sulfito complexes.

The volume of the aqueous extract amounts to 10 l. containing a vitamin $B_{12}$ activity of 137 mg./l., i.e. a total of 1.37 g. 100 g. of kieselguhr are added to the extract which is then adjusted to a pH of 2.5. 220 g. of para-chlorophenol are then added under stirring, whereby the vitamins of the $B_{12}$ group are precipitated onto the kieselguhr. The kieselguhr product which is now charged with the sulfito cobalamines is then suction-filtered, the para-chlorophenol is removed by washing with acetone, and the washed product is finally dried. Approximately 100 g. of a kieselguhr preparation are obtained which has a vitamin $B_{12}$ activity of 13.5 mg. per gram of kieselguhr preparation, i.e. a total activity of approximately 1.35 g. This stage of the process is carried out, in principle, as described by W. Friedrich and K. Bernhauer in "Zeitschrift für Naturforschung," volume 9b (1954), page 755. The volume has now been reduced from 4 cb. m. to 100 g. (about 100 c. cm.). When taking into account that in 4 cb. m. of raw material there was present a vitamin $B_{12}$ activity of 2 g. and the final 100 g. of the kieselguhr preparation still contained a $B_{12}$ activity of 1.35 g., there has been achieved at this latter processing stage a 27,000-fold concentration of the vitamin $B_{12}$ activity when taking into account the losses of the latter incurred during the various process steps.

The last mentioned kieselguhr product contains the vitamins of the $B_{12}$ group in the form of sulfito complexes. The conversion of the sulfito cobalamines to cyano cobalamines according to the invention is carried out during the next following process step of chromatography. For this purpose of conversion, the chromatographic column is charged with a cellulose pulp which is adsorptively saturated with cyanide ions. For instance, a column having a diameter of 8.0 cm. and a height of 50 cm. is charged with a cellulose pulp containing 250 grams by dry weight of cellulose to which 0.5 gram of sodium cyanide have been added.

Water saturated n-butanol containing 0.05% weight/volume of hydro-cyanic acid is used as a developer. This stage of the process is carried out, in principle, as described in patent application Ser. No. 473,714 supra. During the chromatography of the concentrate, during which step the concentration of cyanide ions is substantially 0.1 g./l., the sulfito cobalamines are converted into cyano cobalamines. The further processing is continued in a conventional manner as described in the last mentioned patent application until crystallized vitamin $B_{12}$ factors are obtained.

*Example III*

One cb. m. of a fermentation broth is produced in a conventional manner by growing cultures of *Streptomyces griseus* which broth has a vitamin $B_{12}$ activity of 1.5 mg./l. 2 kg. of sodium bisulfite (0.2% weight/volume) are added to the broth which is then adjusted to a pH of 6.5 and heated to 80° C. After maintaining the broth for 30 minutes at this temperature, the same is cooled and centrifuged. The centrifugate which, combined with the wash water amounts to 1,000 l., is further treated in the manner described in Example I. Thereby, the volume is greatly reduced and the relative $B_{12}$ activity is correspondingly increased, until finally 3.5 l. of an eluate concentrate as in Example I are obtained, which concentrate has a vitamin $B_{12}$ activity of 340 mg./l., i.e. a total of 1.2 g. At this stage of the process according to the invention, the volume of the solution has thus been reduced to the 270th part of the initial volume, i.e.

from 1,000 l. to 3.5 l., while, at the same time, a concentration of the vitamin $B_{12}$ activity, taking into account the losses incurred, has been attained, which is 225 times that of the initial material, i.e. which represents an increase from 1.5 mg./l. to 340 mg./l. In this concentrate the vitamins of the $B_{12}$ group are present in the form of sulfito complexes. In order to convert the latter into cyano cobalamine, the concentrate is further treated by adding thereto 3.5 g. (0.1% weight/volume) of potassium cyanide and the pH value of the concentrate is then adjusted to 6.5 in the manner described in the preceding examples.

Further processing of the solution is carried out in the conventional manner until crystallized vitamin $B_{12}$ is obtained.

*Example IV*

A fermentation broth is obtained from usual fermentation with *Propionibacterium freudenreichii* which broth has a vitamin $B_{12}$ activity of 1.9 mg./l. 1000 l. of this fermentation broth are centrifuged and the resulting 25 kg. of moist bacteria mass are used for processing according to the invention. This bacteria mass contains almost the entire vitamin $B_{12}$ activity, namely a total of 1.8 g. The bacteria mass is suspended in 25 l. of a mixture of iso-propanol and water in a ratio of 1:1, 100 g. of sodium sulfite are added thereto and the suspension is adjusted to a pH of 6.5 in the same manner as described in the preceding examples. The suspension is heated under constant stirring to about 60 to 70° C. for about one half hour and then suction-filtered. This extraction of the same bacteria mass is repeated with the same extraction agent containing iso-propanol, water and sodium sulfite, until the extraction of the vitamin $B_{12}$ active substances is complete. By combining the several extracts a total amount of 10 l. is obtained from which iso-propanol is removed by vacuum distillation and concurrent reduction of liquid volume. The resulting 4 l. of an aqueous concentrate contain a vitamin $B_{12}$ activity of 425 mg./l., i.e. 1.7 g. Up to this stage the process has led to a volume reduction to 1/250 of the initial volume, i.e. from 1,000 l. to 4 l., while, taking into account the losses incurred during the process, a 225-fold concentration of vitamin $B_{12}$ activity, namely from 1.9 mg./l. to 425 mg./l. has been achieved. The vitamins of the $B_{12}$ group are present in this concentrate in the form of their sulfito complexes. In order to convert the sulfito cobalamines to cyano cobalamines, the concentrate is further treated by adding thereto 4 g. (0.1% weight-volume) of potassium cyanide and adjusted to a pH of 6.5. Further processing until a crystallized vitamin $B_{12}$ is obtained, is carried out in the conventional manner.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What we claim is:

1. In a process of producing vitamins of the $B_{12}$ group from a raw material containing the same and comprising a first sequence of steps involving larger liquid volumes, of separating the major portion of said vitamins from the bulk of the impurities containing the vitamins, including formation of at least one adsorbate of the vitamins to an adsorbent, and a final elution step, of concentrating the resulting eluates by evaporation of the eluting agent in vacuum, and a second sequence of steps, involving smaller liquid volumes, extracting the vitamins from the resulting concentrate with the aid of an organic solvent, and isolating, precipitating and finally crystallizing said vitamins, the improvement of (I) carrying out the first sequence and up to the aforesaid extraction step of the second sequence of steps under addition of solutions of sulfite ions to at least one of said steps, while adjusting the pH during the aforesaid step to about 6.5, thereby converting said vitamins to their sulfito complexes, and maintaining sulfite ions present in the treated materials to preserve these sulfito complexes until the volume of the vitamins-containing liquid has been substantially reduced to about 1/250 part of the starting volume of the raw material, converting the vitamins of the $B_{12}$ group from the form of their sulfito complexes to the form of cyano complexes during the aforesaid extraction step, by addition of solutions containing a (CN)-group containing compound capable of forming (CN)-ions upon dissolution, and selected from the group consisting of the alkali metal salts of hydrocyanic acid, complex cyanide salts and organic nitriles, while still maintaining the aforesaid pH of about 6.5, thereby converting said sulfito complexes to the corresponding cyano complexes, and then (II) carrying out the remaining steps of the second stage under addition of solutions of the aforesaid (CN)-group containing compound so as to maintain the presence of cyanide ions to preserve said cyano complexes being vitamins of the $B_{12}$ group proper, up to the final precipitation and crystallization steps.

2. In a process of producing vitamins of the $B_{12}$ group from a raw material containing the same and comprising a first sequence of steps involving larger liquid volumes, of separating the major portion of said vitamins from the bulk of the impurities containing the vitamins, including formation of at least one adsorbate of the vitamins to an adsorbent, and a final elution step, of concentrating the resulting eluates by evaporation of the eluting agent in vacuum, further (a) purifying the concentrate resulting from the first sequence of steps by adding thereto an organic medium consisting of a mixture of orthodichlorobenzene and phenol, thereby transferring the vitamins from the aqueous to the organic phase, separating the latter, washing the same with a buffer solution, and adding to the organic phase containing a butanol water mixture, thereby retransferring the vitamins to the aqueous phase, and adding kieselguhr to the latter to form a vitamins-kieselguhr adsorbate, and (b) chromatographically partitioning the kieselguhr adsorbate with the aid of a developer which comprises the steps of preparing a pulp from a cellulose material and a straight chain butyl alcohol containing water, charging the pulp onto a chromatographic column, then charging a mixture of $B_{12}$ vitamin factors onto the column, and developing the chromatogram by adding a water containing developer comprising a straight chain butyl alcohol, thereby eluting each of the vitamin $B_{12}$ factors contained in said mixture separately, extracting the chromatographic column fractions with water, evaporating the major portion of the water in vacuum, and crystallizing the vitamins under the addition of acetone, the improvement of (I) carrying out the first sequence and part of the second sequence of steps until the formation of the vitamins-kieselguhr adsorbate, inclusively, under repeatedly adding of solutions of sulfite ions and adjustment of the pH of the treated material to about 6.5, and maintaining sulfite ions present in the treated material, thereby converting said vitamins to their sulfito complexes, and (II) adding a (CN)-containing compound capable of forming CN-ions, upon dissolution and selected from the group consisting of alkali metal cyanides, complex cyanides and organic nitriles to the cellulose material forming said pulp and to said developer, in amounts sufficient to attain a concentration of about 0.05 to 0.1% of weight by volume of said CN-ions, while still maintaining the aforesaid pH of about 6.5, thereby converting said sulfito complexes of said vitamins in said chromatographic column to the vitamins of the $B_{12}$ group which are the corresponding cobalamine cyano complexes.

3. The improvement described in claim 2, further comprising the step of controlling the progress of the purification step (a) of extraction with an organic medium in the presence of sulfite ions, by taking repeatedly at intervals a test sample, adjusting its pH to about 6.5 and adding a solution of alkali metal cyanide to the sample, thereby effecting a color change from the range of reddish yellow to red orange, pertaining to the sulfito complexes, to the range of red to violet, pertaining to the cyano complexes of the vitamins, which latter color range is better distinguishable from the color of the impurities contained in the concentrate under extraction than the former color range.

4. A process for obtaining from digested sludge a concentrate of the vitamins of the $B_{12}$ group in which these vitamins are present at about 200 times the rate of concentration of the starting material, comprising the steps of (I) adjusting the pH of the digested sludge to about 6.5 and adding to the latter a first solution containing a substance dissociated under formation of sulfite ions to obtain in the sludge a sulfite ion concentration corresponding to an $SO_2$ content of from 0.05 to 0.2% by weight per volume, heating the sludge to about 80° C., separating the resulting liquid phase containing the vitamins of the $B_{12}$ group in the form of their sulfito complexes, adjusting the pH of the separated liquid phase to about 2.5, treating the liquid phase with bentonite, so as to form an adsorbate of the aforesaid sulfito complexes, eluting the adsorbate with a solution containing sulfite ions in substantially the same concentration as said first solution, treating the resultant eluate with charcoal to form an adsorbate of said sulfito complexes thereon, eluting the resulting adsorbate with a conventional eluting agent containing an alcohol in mixture with water, concentrating the resulting eluate containing said sulfito complexes by heating in vacuum, adding a solution of a compound containing the (CN) group and capable of forming CN-ions upon dissolution to the concentrated eluate, in amounts sufficient to attain therein a concentration of CN-ions of about 0.05 to 0.1% of weight by volume, and adjusting the pH of the latter to about 6.5, thereby converting the sulfito complexes of the vitamins of the $B_{12}$ group into the vitamins proper which are the corresponding cobalamine cyano complexes, and purifying the aqueous concentrate of the latter and then crystallizing the pure vitamins of the $B_{12}$ group by the steps of preparing a pulp from a cellulose material and a straight chain butyl alcohol containing water, charging the pulp onto a chromatographic column, then charging a mixture of $B_{12}$ vitamin factors onto the column, and developing the chromatogram by adding a water-containing developer comprising a straight chain butyl alcohol, thereby eluting each of the vitamin $B_{12}$ factors contained in said mixture separately.

5. A process for producing from digested sludge a concentrate of the vitamins of the $B_{12}$ group contained therein, comprising the steps of (I) adding to the sludge a solution of a substance dissociated into sulfite ions, adjusting the pH of the sludge to about 6.5, heating the sludge to a temperature of about 80° C., and separating the resultant liquid phase containing the major portion of the vitamins of the $B_{12}$ group in the form of their sulfito complexes, purifying the liquid phase by successive adsorption first on bentonite, elution with an aqueous solution of a substance capable of forming in solution sulfite ions, then adsorption on active charcoal, and then elution with a conventional eluting agent containing an alcohol in mixture with water, and further dissolved a substance capable of forming sulfite ions in solution, heating the final eluate containing said sulfito complexes in vacuum to boiling to reduce the volume of the eluate to about 1/250 of the starting volume of digested sludge, and adding to the resulting concentrate a solution of a (CN)-group containing compound capable of forming CN-ions upon dissolution, which compound is selected from the group consisting of alkali metal salts of hydrocyanic acid, complex cyanide salts, and organic nitriles, thereby converting said sulfito complexes to the corresponding vitamins which are the cobalamine cyano complexes, and maintaining the presence of cyanide ions to preserve said cyano complexes up to the final precipitation and crystallization steps.

6. In a process for producing cyano cobalamines from starting materials containing vitamins of the $B_{12}$ group, the steps comprising, in combination, a first stage of treating the starting materials in the presence of sulfite ions corresponding to a concentration of $SO_2$ of from 0.05 to 0.2% by weight per volume and at a pH of about 6.5 and a temperature of about 80° C. for about 30 minutes, and thereafter forming an adsorbate on montmorillonite, and eluting said montmorillonite adsorbate with an aqueous solution containing sulfite ions in approximately the aforesaid concentration, and while maintaining a pH of from 7 to 9 throughout the eluting step, forming a second adsorbate of the vitamins of the $B_{12}$ group from the resulting eluate by adsorption on active carbon, and eluting the adsorbate with aqueous alcoholic eluant, in amounts up to about 10% by volume of the first eluate, at a temperature between 60° and 80° C., thereby obtaining a concentrate in which the content per volume unit of the vitamins of the $B_{12}$ group, present in the treated material as sulfito cobalamines is increased to at least two hundred times that of the starting material, and a second stage of treating the resulting concentrate from the first stage, comprising the step of adding to the last mentioned concentrate an aqueous solution of an agent containing the cyano group and capable of forming CN-ions in a concentration of about 0.05 to 0.1% weight per volume, at substantially the aforesaid pH, whereby the sulfito cobalamines are converted into the vitamins of the $B_{12}$ group which are the corresponding cobalamine cyano complexes, and thereafter the steps of treating a concentrate containing vitamins of the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon di-sulfide, thereby forming an extract solution of said vitamin of the $B_{12}$ group dissolved in said solvent mixture; treating the thus-formed organic extract solution containing the vitamins of the $B_{12}$ group with water and with a water soluble alcohol, thereby causing due to said alcohol substantially quantitative transfer of said vitamins of the $B_{12}$ group into the aqueous phase; saturating the thus-obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed on said absorbent; and recovering the thus-precipitated vitamins of the $B_{12}$ group.

7. In a process for producing cyano cobalamines from starting materials containing vitamins of the $B_{12}$ group, the steps comprising, in combination, a first stage of treating the starting materials in the presence of sulfite ions corresponding to a concentration of $SO_2$ of from 0.05 to 0.2% by weight per volume and at a pH of about 6.5 and a temperature of about 80° C. for about 30 minutes, and thereafter forming an adsorbate on montmorillonite, and eluting said montmorillonite adsorbate with an aqueous solution containing sulfite ions in approximately the aforesaid concentration, and while maintaining a pH of from 7 to 9 throughout the eluting step, forming a second adsorbate of the vitamins of the $B_{12}$ group from the resulting eluate by adsorption on active carbon, and eluting the adsorbate with aqueous alcoholic eluant, in amounts up to about 10% by volume of the first eluate, at a temperature between 60° and 80° C., thereby obtaining a concentrate in which the content per volume unit of the vitamins of the $B_{12}$ group, present in the treated material as sulfito cobalamines is increased to at least two hundred times that of the starting material; a second stage of treating the resulting concentrate by the steps of solvent extraction of treating a concentrate containing vitamins of the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamin of the $B_{12}$ group dissolved in said solvent mixture; treating the thus-formed organic extract solution containing the vitamins of the $B_{12}$ group with water and with a water soluble alcohol, thereby causing due to said alcohol substantially quantitative transfer of said vitamins of the $B_{12}$ group into the aqueous phase; saturating the thus-obtained aqueous solution containing said vitamins of the $B_{12}$ group dissolved therein with a phenol selected from the group consisting of meta and para chlorophenol in the presence of kieselguhr, thereby forming a precipitate containing the oily water-insoluble complex of said vitamins of the $B_{12}$ group and said phenol absorbed on said kieselguhr in the presence of sulfite ions, corresponding to approximately the aforesaid concentration of $SO_2$, and subjecting the resulting kieselguhr preparation to the steps of chromatographic partition comprising preparing a pulp from a cellulose material and a straight chain butyl alcohol containing water, charging the pulp onto a chromatographic column, then charging a mixture of $B_{12}$ vitamin factors onto the column, and developing the chromatogram by adding a water-containing developer comprising a straight chain butyl alcohol, thereby eluting each of the vitamin $B_{12}$ factors contained in said mixture separately; and wherein the aforesaid kieselguhr preparation is developed in a chromatographic column of a cellulose material pulp containing CN-ions with a developer also containing CN-ions.

8. In a process for producing cyano cobalamines from starting materials containing vitamins of the $B_{12}$ group, the steps comprising, in combination, a first stage of treating the starting materials in the presence of sulfite ions corresponding to a concentration of $SO_2$ from 0.05 to 0.2% by weight per volume and at a pH of about 6.5 and a temperature of about 80° C. for about 30 minutes, and thereafter forming an adsorbate on montmorillonite, and eluting said montmorillonite adsorbate with an ajueous solution containing sulfite ions in approximately the aforesaid concentration, and while maintaining a pH of from 7 to 9 throughout the eluting step, forming a second adsorbate of the vitamins of the $B_{12}$ group from the resulting eluate by adsorption on active carbon, and eluting the adsorbate with aqueous alcoholic eluant, in amounts up to about 10% by volume of the first eluate, at a temperature between 60° and 80° C., thereby obtaining an increase of the content per volume unit of vitamins of the $B_{12}$ group present in the treated material as sulfito cobalamines to at least two hundred times that of the starting material, and a second stage of treating the concentrate resulting from the first stage, during which second stage the sulfito cobalamines are converted into cyano cobalamines with the aid of an agent containing the cyano group and capable of forming CN ions in water in a concentration of about 0.05 to 0.1% weight per volume, at substantially the aforesaid pH of 6.5, said second stage comprising the steps of treating a concentrate containing vitamins of the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamin of the $B_{12}$ group dissolved in said solvent mixture; treating the thus-formed organic extract solution containing the vitamins of the $B_{12}$ group with water and with a water soluble alcohol, thereby causing due to said alcohol substantially quantitative transfer of said vitamins of the $B_{12}$ group into the aqueous phase; saturating the thus-obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed on said absorbent; and recovering the thus-precipitated vitamins of the $B_{12}$ group; the conversion of sulfito cobalamines to cyano cobalamines taking place during the step of said second stage, at which the content of sulfito cobalamines is at least one gram per kilogram of dry weight of the treated material; and finally steps for isolating the resulting cyano cobalamine in crystallized form.

9. In a process for producing cyano cobalamines from starting materials containing vitamins of the $B_{12}$ group, the steps comprising, in combination, a first stage of treating the starting materials in the presence of sulfite ions corresponding to a concentration of $SO_2$ from 0.05 to 0.2% by weight per volume and at a pH of about 6.5 and a temperature of about 80° C. for about 30 minutes, and thereafter forming an adsorbate on montmorillonite, and eluting said montmorillonite adsorbate with an aqueous solution containing sulfite ions in approximately the aforesaid concentration, and while maintaining a pH of from 7 to 9 throughout the eluting step, forming a second adsorbate of the vitamins of the $B_{12}$ group from the resulting eluate by adsorption on active carbon, and eluting the adsorbate with aqueous alcoholic eluant, in amounts up to about 10% by volume of the first eluate, at a temperature between 60° and 80° C., thereby obtaining an increase of the content per volume unit of vitamins of the $B_{12}$ group present in the treated material as sulfito cobalamines to at least two hundred times that of the starting material, and a second stage of treating the concentrate resulting from the first stage, during which second stage the sulfito cobalamines are converted into cyano cobalamines with the aid of an alkali metal salt of hydrocyanic acid capable of forming CN ions in water in a concentration of about 0.05 to 0.1% weight per volume, at substantially the aforesaid pH of 6.5, said second stage comprising the steps of treating a concentrate containing vitamins of the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamin of the $B_{12}$ group dissolved in said solvent mixture; treating the thus-formed organic extract solution containing the viamins of the $B_{12}$ group with water and with a water soluble alcohol, thereby causing due to said alcohol substantially quantitative transfer of said vitmains of the $B_{12}$ group into the aqueous phase; saturating the thus-obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed on said absorbent; and recovering the thus-precipitated vitamins of the $B_{12}$ group; the conversion of sulfito cobalamines to cyano cobalamines taking place during the step of said second stage, at which the content of sulfito cobalamines is at least one gram per kilogram of dry weight of the treated material, and finally steps for isolating the resulting cyano cobalamine in crystallized form.

10. In a process for producing cyano cobalamines from starting materials containing vitamins of the $B_{12}$ group, the steps comprising, in combination, a first stage of treating the starting materials in the presence of sulfite ions corresponding to a concentration of $SO_2$ from 0.05 to 0.2% by weight per volume and at a pH of about 6.5 and a temperature of about 80° C. for about 30 minutes, and thereafter forming an adsorbate on montmorillonite, and eluting said montmorillonite adsorbate with an aqueous solution containing sulfite ions in approximately the aforesaid concentration, and while maintaining a pH of from 7 to 9 throughout the eluting step, forming a second adsorbate of the vitamins of the $B_{12}$ group from the resulting eluate by adsorption on active carbon, and eluting the adsorbate with aqueous alcoholic eluent, in amounts up to about 10% by volume of the first eluate, at a temperature between 60° and 80° C., thereby obtaining an increase of the content per volume unit of vitamins of the $B_{12}$ group present in the treated material as sulfito cobalamines to at least two hundred times that of the starting material, and a second stage of treating the concentrate resulting from the first stage, during which second stage the sulfito cobalamines are converted into cyano cobalamines with the aid of a complex cyanide salt capable of forming CN ions in water in a concentration of about 0.05 to 0.1% weight per volume, at substantially the aforesaid pH of 6.5, said second stage comprising the steps of treating a concentrate containing vitamins the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamin of the $B_{12}$ group dissolved in said solvent mixture; treating the thus-formed organic extract solution containing the vitamins of the $B_{12}$ group with water and with a water soluble alcohol, thereby causing due to said alcohol substantially quantitative transfer of said vitamins of the $B_{12}$ group into the aqueous phase; saturating the thus-obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed on said absorbent; and recovering the thus-precipitated vitamins of the $B_{12}$ group; the conversion of sulfito cobalamines to cyano cobalamines taking place during the step of said second stage, at which the content of sulfito cobalamines is at least one gram per kilogram of dry weight of the treated material; and finally steps for isolating the resulting cyano cobalamine in crystallized form.

11. In a process for producing cyano cobalamines from starting materials containing vitamins of the $B_{12}$ group, the steps comprising, in combination, a first stage of treating the starting materials in the presence of sulfite ions corresponding to a concentration of $SO_2$ from 0.05 to 0.2% by weight per volume and at a pH of about 6.5 and a temperature of about 80° C. for about 30 minutes, and thereafter forming an adsorbate on montmorillonite, and eluting said montmorillonite adsorbate with an aqueous solution containing sulfite ions in approximately the aforesaid concentration, and while maintaining a pH of from 7 to 9 throughout the eluting step, forming a second adsorbate of the vitamins of the $B_{12}$ group from the resulting eluate by adsorption on active carbon, and eluting the adsorbate with aqueous alcoholic eluant, in amounts up to about 10% by volume of the first eluate, at a temperature between 60° and 80° C., thereby obtaining an increase of the content per volume unit of vitamins of the $B_{12}$ group present in the treated material as sulfito cobalamines to at least two hundred times that of the starting material, and a second stage of treating the concentrate resulting from the first stage, during which second stage the sulfito cobalamines are converted into cyano cobalamines with the aid of an organic nitrile capable of forming CN ions in water in a concentration of about 0.05 to 0.1% weight per volume, at substantially the aforesaid pH of 6.5, said second stage comprising the steps of treating a concentrate containing vitamins of the $B_{12}$ group with an organic solvent mixture comprising a mono-halogenated phenol selected from the group consisting of mono-halogenated phenols having the halogen group in the position meta and mono-halogenated phenols having the halogen group in the position para to the hydroxyl group of said phenol, dissolved in a liquid organic substance in which said vitamins of the $B_{12}$ group are insoluble and being selected from the group consisting of hydrocarbons, halogenated hydrocarbons and carbon disulfide, thereby forming an extract solution of said vitamin of the $B_{12}$ group dissolved in said solvent mixture; treating the thus-formed organic extract solution containing the vitamins of the $B_{12}$ group with water and with a water soluble alcohol, thereby causing due to said alcohol substantially quantitative transfer of said vitamins of the $B_{12}$ group into the aqueous phase; saturating the thus-obtained aqueous solution containing said vitamins of the $B_{12}$ group dissolved therein with a phenol selected from the group consisting of meta and para chlorophenol in the presence of an inert solid porous absorbent material, thereby forming a precipitate containing the oily water-insoluble complex of said vitamins of the $B_{12}$ group and said phenol absorbed on said absorbent; and recovering the thus-precipitated vitamins of the $B_{12}$ group; the conversion of sulfito cobalamines to cyano cobalamines taking place during the step of said second stage, at which the content of sulfito cobalamines is at least one gram per kilogram of dry weight of the treated material; and finally steps for isolating the resulting cyano cobalamine in crystallized form.

References Cited in the file of this patent

UNITED STATES PATENTS

| | | |
|---|---|---|
| 2,530,416 | Wolf | Nov. 21, 1950 |
| 2,631,964 | Burnings | Mar. 17, 1953 |
| 2,721,162 | Fricke | Oct. 18, 1955 |
| 2,738,302 | Kaczka | Mar. 31, 1956 |

OTHER REFERENCES

Loy: J. of the Asso. of Official Agri. Chem., vol. 35, No. 1, Feb. 15, 1952, pp. 169–174.

Prier: Arch. of Biochem. and Biophysics, vol. 40, No. 2, October 1952, pp. 474–476.